(12) United States Patent
Walter et al.

(10) Patent No.: US 10,344,844 B2
(45) Date of Patent: Jul. 9, 2019

(54) METHOD AND SYSTEM FOR CONTROLLING A LIMITED SLIP DIFFERENTIAL

(71) Applicant: GM GLOBAL TECHNOLOGY OPERATIONS LLC, Detroit, MI (US)

(72) Inventors: James R. Walter, Ann Arbor, MI (US); Jason Matthew Kolk, White Lake, MI (US); Satish Sundaram, West Bloomfield, MI (US); Steven T. Schweitzer, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 220 days.

(21) Appl. No.: 15/604,047

(22) Filed: May 24, 2017

(65) Prior Publication Data

US 2018/0340600 A1 Nov. 29, 2018

(51) Int. Cl.
*F16H 48/20* (2012.01)
*F16H 48/22* (2006.01)
*F16D 48/06* (2006.01)

(52) U.S. Cl.
CPC ............. *F16H 48/22* (2013.01); *F16D 48/06* (2013.01); *F16D 2500/1045* (2013.01); *F16D 2500/10425* (2013.01); *F16D 2500/3107* (2013.01); *F16D 2500/3108* (2013.01); *F16D 2500/5075* (2013.01); *F16D 2500/50287* (2013.01); *F16H 2048/204* (2013.01)

(58) Field of Classification Search
CPC .... F16H 48/20; F16H 48/22; F16H 2048/204; F16D 48/06; F16D 2500/10425; F16D 2500/3107

See application file for complete search history.

(56) References Cited

U.S. PATENT DOCUMENTS

| | | | |
|---|---|---|---|
| 9,199,640 B2 | 12/2015 | Weston et al. | |
| 2012/0259536 A1* | 10/2012 | Klier | B60W 40/12 701/124 |
| 2013/0138288 A1* | 5/2013 | Nickolaou | B60W 40/13 701/23 |
| 2015/0081170 A1* | 3/2015 | Kikuchi | B60G 17/018 701/37 |

* cited by examiner

*Primary Examiner* — Edwin A Young
(74) *Attorney, Agent, or Firm* — Cantor Colburn LLP

(57) ABSTRACT

A system and method for electronically controlling a limited slip differential is disclosed. The method includes determining, by an electronic controller of a vehicle, a request for a limited-slip-differential coupling torque to be applied. The request is based upon an estimation of the vehicle's mass. The method also includes transmitting the request to an electronic limited slip differential of the vehicle. The electronic limited slip differential is configured to apply the requested limited-slip-differential coupling torque.

20 Claims, 3 Drawing Sheets

METHOD AND SYSTEM FOR CONTROLLING A LIMITED SLIP DIFFERENTIAL

INTRODUCTION

The subject embodiments relate to controlling a limited slip differential. Specifically, one or more embodiments can be directed to electronically controlling a limited slip differential based upon an estimation of vehicle mass, for example.

Within a motor vehicle, a differential is a device that controls the rotational speed of an outer drive wheel and the rotational speed of an inner drive wheel when the motor vehicle performs a turn. Specifically, when performing the turn, the differential is configured to rotate the outer drive wheel faster than the inner drive wheel. Because the outer drive wheel travels along a wider curve during the turn as compared to the inner drive wheel, the outer wheel needs to rotate faster than the inner drive wheel during the turn. Differentials enable vehicles to properly configure the relative rotational speeds between the inner drive wheels and the outer drive wheels during turns.

SUMMARY

In one exemplary embodiment, a method includes determining, by an electronic controller of a vehicle, a request for a limited-slip-differential coupling torque to be applied. The request is based upon an estimation of the vehicle's mass. The method also includes transmitting the request to an electronic limited slip differential of the vehicle. The electronic limited slip differential is configured to apply the requested limited-slip-differential coupling torque.

In another exemplary embodiment, the estimation of the vehicle's mass includes an estimation of mass of a heavily-loaded or heavily-laden vehicle.

In another exemplary embodiment, the configured application of the requested limited-slip-differential coupling torque results in a yaw moment and a wheel rotation that causes the vehicle to move along a wider curve when the vehicle turns.

In another exemplary embodiment, the method also includes determining a difference between the estimated vehicle mass and a curb mass of the vehicle. The determining the request for limited-slip-differential coupling torque to be applied includes determining the coupling torque based on the determined difference.

In another exemplary embodiment, the determining the request for limited-slip-differential coupling torque to be applied includes changing a default coupling torque if the estimated vehicle mass exceeds a vehicle mass threshold. The default coupling torque is a configured pre-load torque that is to be applied when the estimated vehicle mass does not exceed the vehicle mass threshold.

In another exemplary embodiment, the changing the default coupling torque includes changing the default coupling torque in accordance with a lookup table based on the vehicle's velocity.

In another exemplary embodiment, the changing the default coupling torque includes changing the default coupling torque in accordance with a lookup table based on a braking characteristic.

In another exemplary embodiment, the determining the request for the limited-slip-differential coupling torque to be applied includes determining that a hysteresis is to be applied to the limited-slip-differential coupling torque.

In another exemplary embodiment, the determining the request for limited-slip-differential coupling torque to be applied includes determining a yaw error and/or a slip target based on the estimation of the vehicle mass.

In another exemplary embodiment, the determining the request for the limited-slip-differential coupling torque to be applied includes determining a center of gravity based on the estimation of the vehicle mass.

In another exemplary embodiment, a system within a vehicle can include an electronic controller. The electronic controller can be configured to determine a request for a limited-slip-differential coupling torque to be applied. The request is based upon an estimation of the vehicle's mass. The electronic controller can also be configured to transmit the request to an electronic limited slip differential of the vehicle. The electronic limited slip differential is configured to apply the requested limited-slip-differential coupling torque.

In another exemplary embodiment, the estimation of the vehicle's mass includes an estimation of mass of a heavily-loaded or heavily-laden vehicle.

In another exemplary embodiment, the configured application of the requested limited-slip-differential coupling torque results in a yaw moment and a wheel rotation that causes the vehicle to move along a wider curve when the vehicle turns.

In another exemplary embodiment, the electronic controller is further configured to determine a difference between the estimated vehicle mass and a curb mass of the vehicle. The determining the request for limited-slip-differential coupling torque to be applied includes determining the coupling torque based on the determined difference.

In another exemplary embodiment, the determining the request for limited-slip-differential coupling torque to be applied includes changing a default coupling torque if the estimated vehicle mass exceeds a vehicle mass threshold. The default coupling torque is a configured pre-load torque that is to be applied when the estimated vehicle mass does not exceed the vehicle mass threshold.

In another exemplary embodiment, the changing the default coupling torque includes changing the default coupling torque in accordance with a lookup table based on the vehicle's velocity.

In another exemplary embodiment, the changing the default coupling torque includes changing the default coupling torque in accordance with a lookup table based on a braking characteristic.

In another exemplary embodiment, the determining the request for the limited-slip-differential coupling torque to be applied includes determining that a hysteresis is to be applied to the limited-slip-differential coupling torque.

In another exemplary embodiment, the determining the request for limited-slip-differential coupling torque to be applied includes determining a yaw error and/or a slip target based on the estimation of the vehicle mass.

In another exemplary embodiment, the determining the request for the limited-slip-differential coupling torque to be applied includes determining a center of gravity based on the estimation of the vehicle mass.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
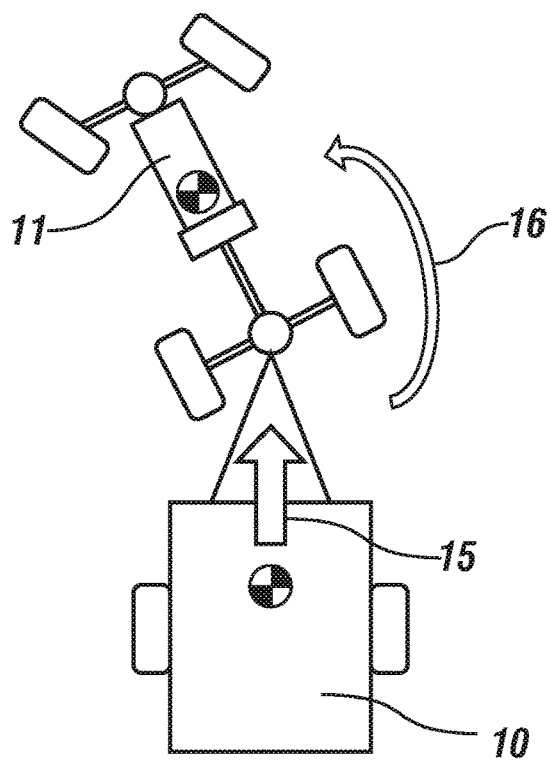
FIG. 1 depicts a vehicle that is beginning to perform a turn with an attached trailer.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, an electronic controller of a vehicle can be configured to control an electronic limited slip differential (eLSD) based upon one or more inputs. An eLSD is generally considered to be an electronically-controlled coupling. When the eLSD is actuated by the electronic controller, the eLSD is configured to apply a coupling force between the left rear and right rear wheels of the vehicle, as the vehicle turns. This applied coupling force will tend to equalize the speeds of the rear wheels, as described in more detail below. As the coupling force tends to equalize the speeds of the rear wheels, the inside wheel will be driven faster during the turn, while the outside wheel will be slowed during the turn. The opposing forces that are applied on the inside/outside wheels will result in a yaw moment around the vehicle's center of gravity, as described in more detail below. The coupling force that is applied by the eLSD can be referred to as a limited slip differential (LSD) coupling torque that is provided by the eLSD.

The limited slip differential coupling torque that is applied by the eLSD can be based on one or more inputs and/or parameters. An example of one of the inputs and/or parameters is a vehicle mass. The vehicle mass can initially be set to a default value that corresponds to a curb mass, for example. The curb mass of a vehicle is generally considered to be a total standard weight of the vehicle, without passengers or cargo.

As described in more detail below, rather than assuming that the vehicle's mass corresponds to a default unladen vehicle mass, embodiments can perform an estimation of the vehicle mass, and embodiments can control the eLSD based at least on the results of the estimation. Specifically, embodiments can control an amount of limited slip differential coupling torque that is applied by the eLSD based at least on the results of the estimation. If embodiments detect that the vehicle is a heavily-laden vehicle, the implemented control logic of the electronic controller can alter pre-load settings, vehicle parameters, and performance targets, for example. Pre-load settings can be default settings that are applicable to a vehicle that is assumed to be unladen. A pre-load torque can be a default amount of coupling torque that is based at least on the default settings. For example, an amount of pre-load torque can be based at least on a curb mass. On the other hand, if embodiments determine that the vehicle is a heavily-laden vehicle, the pre-load settings can be changed, and the LSD coupling torque can be changed away from the pre-load torque to a different amount of torque.

FIG. 1 depicts a vehicle that is beginning to perform a turn with an attached trailer. A vehicle that is loaded with weight or that is towing a trailer can be considered to be a heavily-loaded/heavily-laden vehicle. Heavily-loaded and heavily-laden vehicles are generally less maneuverable as compared to unladen vehicles. Referring to FIG. 1, as vehicle 11 is braking to perform a turn, attached trailer 10 can impart a forward force 15 upon vehicle 11. This imparted force 15 can result in a yaw moment 16, which can result in a sharper turn for vehicle 11.

The maneuverability and stability of heavily-laden vehicle 11 can be improved by controlling an eLSD to apply a coupling torque that results in a separate, counteracting yaw moment against yaw moment 16. The counteracting yaw moment can cause the vehicle's turn to widen, which can improve maneuverability and control of the vehicle.

When determining the coupling torque that the eLSD should apply/provide, instead of determining the coupling torque based upon an assumed, default unladen vehicle mass, embodiments can determine the coupling torque based at least on an estimation relating to total vehicle weight. The total vehicle weight can correspond to the combined weight of the vehicle, passengers, fuel, cargo, and added trailer, for example. In other words, the electronic controller of one or more embodiments can be configured to dynamically determine an estimated vehicle mass and use this estimation to control the eLSD, as opposed to merely using default, pre-set parameters for controlling the eLSD. As such, embodiments can detect that a vehicle is a heavily-laden vehicle, and embodiments can responsively alter eLSD control in real-time to improve vehicle maneuverability and control.

Figure 2:
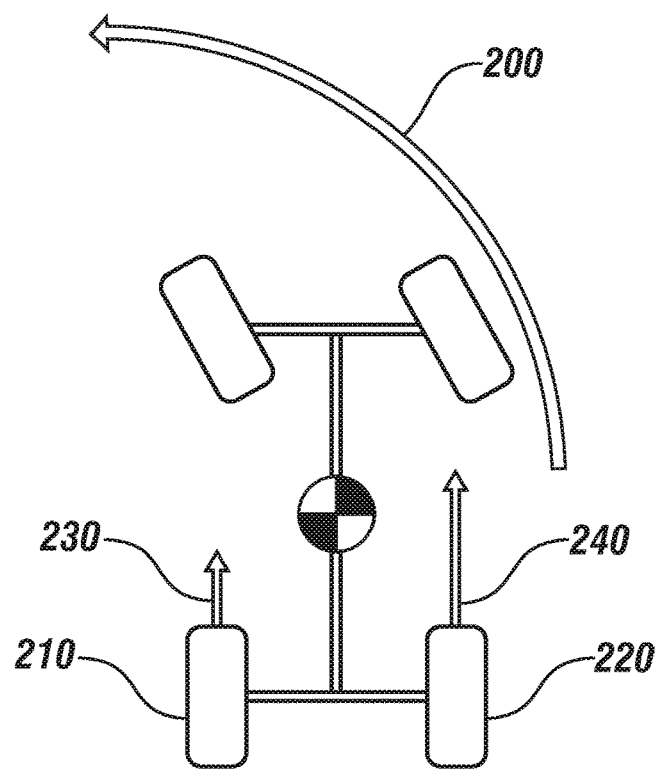
FIG. 2 depicts a vehicle that is beginning to perform a turn, in accordance with one or more embodiments.

FIG. 2 depicts a vehicle that is beginning to perform a turn, in accordance with one or more embodiments. As shown by FIG. 2, in order to turn along curved path 200, the vehicle's inner rear wheel 210 will rotate at a slower speed in comparison to the vehicle's outer rear wheel 220 in order to complete the turn. In other words, as described above, the forward speed 230 of inner wheel 210 will be less than the forward speed 240 of rear wheel 220.

Figure 3:
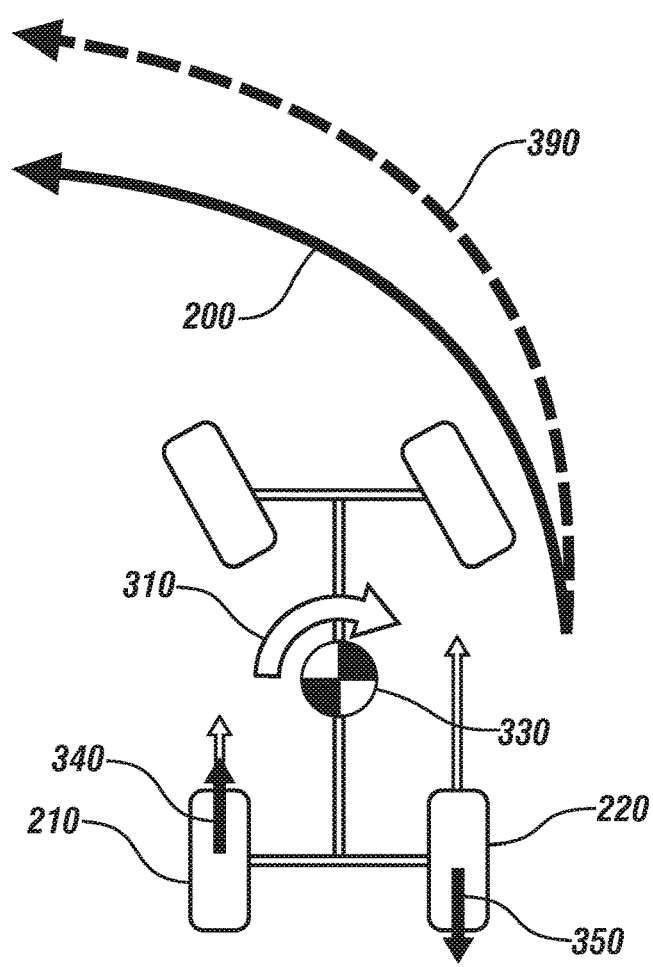
FIG. 3 depicts initiating electronic control of a limited slip differential, in accordance with one or more embodiments.

FIG. 3 depicts initiating electronic control of a limited slip differential, in accordance with one or more embodiments. As described above, when the eLSD is actuated by an electronic controller, the eLSD applies a coupling force that tends to equalize the speeds of the rear wheels. The coupling force will tend to apply a first force 340 to the inner rear wheel 210 to increase the forward speed of inner rear wheel 210, while the coupling force will tend to apply a second force 350 to the outer rear wheel 220 to decrease the forward speed of outer rear wheel 220. The applied coupling force results in a yaw moment 310 at the vehicle's center of gravity 330 that can improve maneuverability and control of the vehicle. As described above, yaw moment 310 can improve maneuverability and control of the vehicle because yaw movement 310 can counteract a separate yaw moment that is, for example, imparted on the vehicle by an attached trailer. As a result of the coupling force that is applied by the eLSD, the vehicle will tend to turn along a wider curve 390 as compared to the initial curved path 200. Turning the vehicle along the wider curve 390 can improve the maneuverability and control of the vehicle, as compared to turning the vehicle along the sharper curve of the initial curved path 200.

Figure 4:
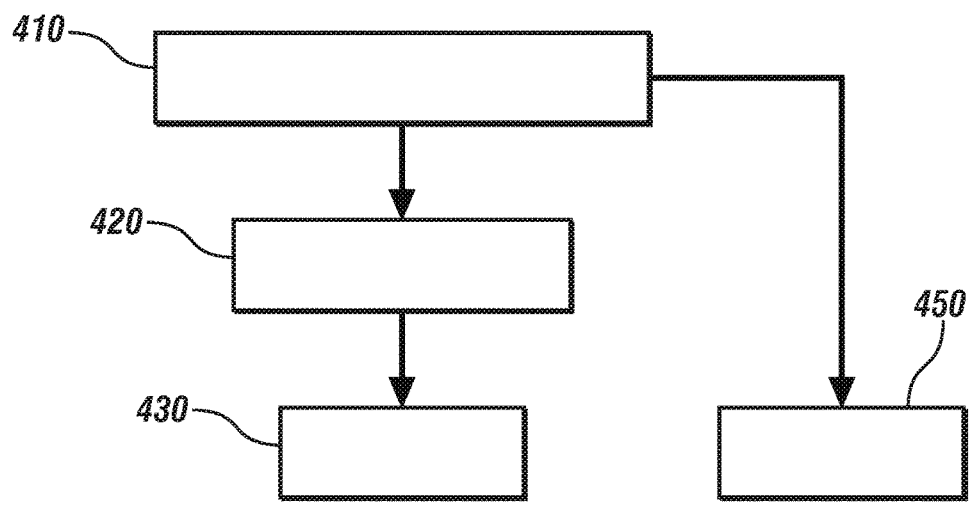
FIG. 4 depicts a configuration of a system that electronically controls a limited slip differential, in accordance with one or more embodiments.

FIG. 4 depicts a configuration of a system that electronically controls an eLSD, in accordance with one or more embodiments. The system can be implemented within an electronic controller, for example. An eLSD can be typically controlled according to a default control mode (based upon default pre-set parameters). As described above, one possible default pre-set parameter can be a default unladen vehicle weight or a default vehicle curb weight. Based on these initial default weight parameters, the system generally instructs the eLSD to apply a default pre-load torque. However, referring to FIG. 4, at 410, embodiments can perform an estimation of vehicle mass, and embodiments can switch away from the default control mode to a different control mode if the estimated vehicle mass exceeds a heavy mass threshold. If the estimated vehicle mass exceeds a heavy mass threshold, then the vehicle can be considered to be a heavily-laden/heavily-loaded vehicle, and embodiments can modify the coupling torque at 420. In one embodiment, if the estimated vehicle mass exceeds the heavy mass threshold value, then the electronic controller can set a stored Boolean flag to "TRUE" to indicate that a heavily-laden/heavily-loaded vehicle has been detected. Otherwise, if the estimated vehicle mass does not exceed the heavy mass threshold value, at 450, the eLSD can be instructed to provide the default coupling torque.

Embodiments can determine an estimation of vehicle mass, at 410, in a number of different ways. For example, embodiments can determine estimations of vehicle mass based upon data that is inputted by customers/drivers.

Customers/drivers can input data via a human-machine interface of the vehicle. Embodiments can also perform estimations of vehicle mass based upon mass data that is communicated to the vehicle by third-party measurement devices. A third-party measurement device can include, for example, a mass scale at a truck stop. Estimations of vehicle mass can also be based upon mass data that is received via a telematics interface. Embodiments can also perform estimations of vehicle mass based upon information that is collected by the vehicle's suspension system. For example, embodiments can utilize sensor data that is collected from active suspension components to estimate the vehicle's mass. Embodiments can also reference information that is derived from ride-height sensors, information relating to air suspension pressure/force, and/or information relating to shock and spring information. Embodiments can also reference information relating to vehicle motion from accelerometers, inertial measurement devices, and wheel speed sensors. Embodiments can also reference information relating to vehicle forces from propulsion systems and braking systems. In order to determine estimations of vehicle mass, embodiments can also refer to information that is communicated to the vehicle through a trailer connection interface, information relating to the tires of the vehicle, and/or information collected by sensors in the vehicle's seats.

After performing a determination that the vehicle is a heavily-laden/heavily-loaded vehicle at 410, embodiments can then be configured to determine a modified LSD coupling torque request at 420. Embodiments can also determine a difference between the estimated vehicle mass and the vehicle's curb mass. As described above, the vehicle curb mass is generally considered to be a total standard weight of the vehicle, without passengers or cargo. The vehicle curb mass can be the mass that the above-described default values are based on. Based on at least the determined difference between the estimated vehicle mass and the vehicle curb mass, embodiments can determine the modified LSD coupling torque request at 420.

For example, an embodiment can be configured to determine a modified LSD coupling torque by multiplying a default coupling torque by a gain value. The gain value can be calculated in accordance with a lookup table based at least on a vehicle velocity. With embodiments that determine a difference between the estimated vehicle mass and the vehicle curb mass, the default coupling torque can be multiplied by a gain value that is also based on a difference between the estimated vehicle mass and the default vehicle curb mass. For example, the gain value can be proportional to the difference between the estimated vehicle mass and the default vehicle curb mass.

An embodiment can also determine a modified LSD coupling torque by increasing the coupling torque in response to a braking event. The increased coupling torque can be determined, for example, based upon a lookup table. The increased torque can be determined from the lookup table based upon a vehicle velocity and based upon a braking characteristic that is applied by the driver of the vehicle. For example, the torque can be modified depending on how hard the driver has applied the brake.

An embodiment can also modify the LSD coupling torque by applying a hysteresis to the final coupling torque request.

An embodiment can also modify the LSD coupling torque by modifying vehicle parameters and performance targets from which a pre-load torque and a feedback torque are derived, as described in more detail below. For example, an embodiment can modify an understeer gradient target, where a default understeer gradient target can be multiplied by a gain value. The gain value can be calculated from a lookup table based on a vehicle velocity, for example. With embodiments that determine a difference between the estimated vehicle mass and the vehicle curb mass, a default understeer gradient target can be multiplied by a gain value that is proportional to the difference between the vehicle mass estimation and the vehicle curb mass.

Other embodiments can also modify the LSD coupling torque by modifying vehicle parameters and performance targets from which the pre-load torque and the feedback torque are derived. For example, other embodiments can modify a yaw error or modify a slip target. The yaw error target can be modified by multiplying a default yaw error target with a gain value. The slip target can be modified by multiplying a default slip target with another gain value. These gain values can be calculated from one or more lookup tables based on a vehicle velocity, for example. With embodiments that determine a difference between the estimated vehicle mass and the vehicle curb mass, the corresponding gain values can be proportional to the difference between vehicle mass estimation and vehicle curb mass.

Another possible vehicle parameter and performance target that can be modified is a center-of-gravity of a vehicle. The location of the vehicle's center of gravity can be changed.

Based upon a determined difference between the estimated vehicle mass and the vehicle curb mass, embodiments can also modify a vehicle parameter and performance setting of a normal force for a tire friction circle based upon the determined difference in mass.

Once a modified LSD coupling torque request is determined, this determined torque request can be transmitted to the eLSD to be applied by the eLSD, at 430.

Figure 5:
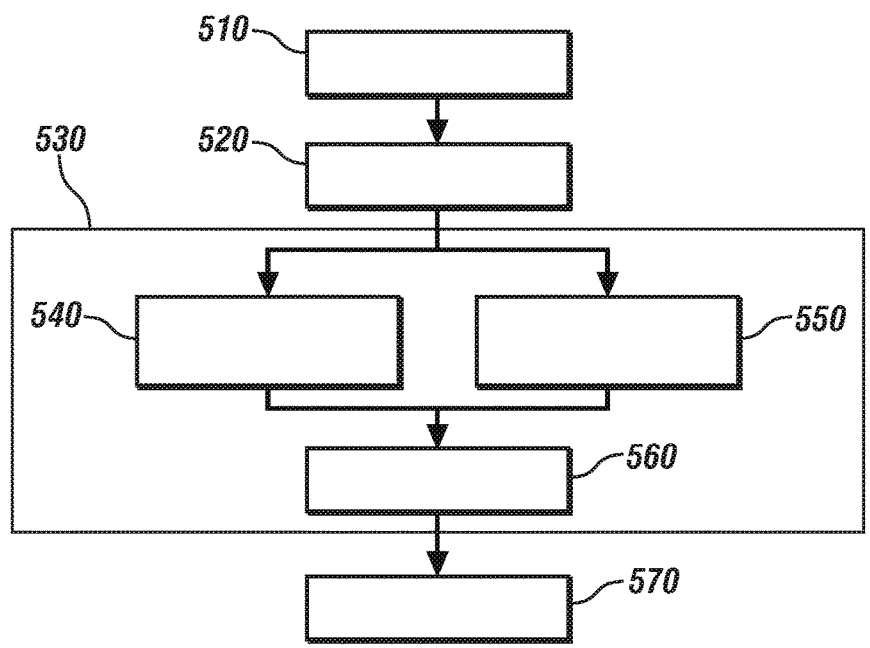
FIG. 5 depicts a flowchart of a method in accordance with one or more embodiments.

FIG. 5 depicts a flowchart of a method in accordance with one or more embodiments. The method of FIG. 5 can be performed in order to implement the functionality of determining a modified LSD coupling torque request, at 420 of FIG. 4, for example. The method can include, at block 510, determining, by an electronic controller of a vehicle, an estimation of vehicle's mass. The method also includes, at block 520, determining vehicle parameters and performance targets. Vehicle parameters and performance targets include, but are not limited to, a vehicle mass, a vehicle center-of-gravity location, a normal force at a tire, a presence of a trailer, a vehicle yaw-rate target, a vehicle yaw-rate error target, a vehicle wheel-slip target, and/or a vehicle understeer gradient target. The method also includes, at block 530, determining an amount of torque to be applied by the limited-slip-differential (LSD) coupling. The method also includes, at block 540, determining a pre-load torque component of the limited slip differential coupling torque. The pre-load torque component represents a feed-forward torque request. The method also includes, at block 550, determining a feed-back torque component of the limited slip differential coupling torque. The feedback torque component represents the requested torque that is in response to differences between wheel slip targets and yaw rate targets as compared to the real wheel slip and the yaw rate. The method also includes, at block 560, arbitrating a limited slip differential (LSD) final coupling torque amount. The method also includes, at block 570, transmitting the determined coupling torque amount to an electronic limited-slip-differential of the vehicle. The electronic limited-slip-differential is configured to apply the requested LSD coupling torque.

Figure 6:
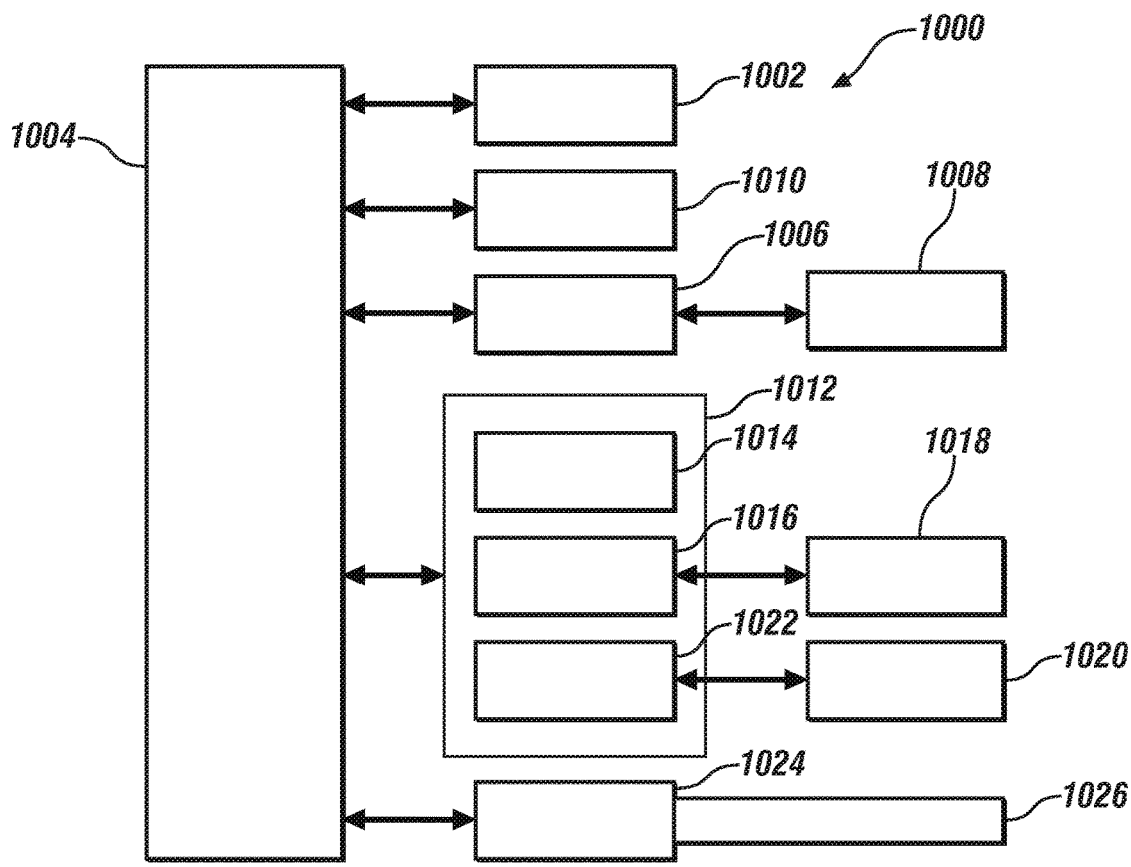
FIG. 6 depicts a high-level block diagram of a computing system, which can be used to implement one or more embodiments.

FIG. 6 depicts a high-level block diagram of a computing system 1000, which can be used to implement one or more embodiments. Computing system 1000 can correspond to, at least, an electronic processing device/controller that can receive and process the input of a vehicle mass estimation, as described above, for example. The electronic processing device can be a part of an embedded system of electronics within a vehicle. With one or more embodiments, computing system 1000 can correspond to an electronic control unit (ECU) of a vehicle. Computing system 1000 can be used to implement hardware components of systems capable of performing methods described herein. Although one exemplary computing system 1000 is shown, computing system 1000 includes a communication path 1026, which connects computing system 1000 to additional systems (not depicted). Computing system 1000 and additional system are in communication via communication path 1026, e.g., to communicate data between them.

Computing system 1000 includes one or more processors, such as processor 1002. Processor 1002 is connected to a communication infrastructure 1004 (e.g., a communications bus, cross-over bar, or network). Computing system 1000 can include a display interface 1006 that forwards graphics, textual content, and other data from communication infrastructure 1004 (or from a frame buffer not shown) for display on a display unit 1008. Display unit 1008 can correspond to at least a portion of a dashboard of a vehicle, for example. Computing system 1000 also includes a main memory 1010, such as random access memory (RAM), and can also include a secondary memory 1012. There also can be one or more disk drives 1014 contained within secondary memory 1012. Removable storage drive 1016 reads from and/or writes to a removable storage unit 1018. As will be appreciated, removable storage unit 1018 includes a computer-readable medium having stored therein computer software and/or data.

In alternative embodiments, secondary memory 1012 can include other similar means for allowing computer programs or other instructions to be loaded into the computing system. Such means can include, for example, a removable storage unit 1020 and an interface 1022.

In the present description, the terms "computer program medium," "computer usable medium," and "computer-readable medium" are used to refer to media such as main memory 1010 and secondary memory 1012, removable storage drive 1016, and a disk installed in disk drive 1014. Computer programs (also called computer control logic) are stored in main memory 1010 and/or secondary memory 1012. Computer programs also can be received via communications interface 1024. Such computer programs, when run, enable the computing system to perform the features discussed herein. In particular, the computer programs, when run, enable processor 1002 to perform the features of the computing system. Accordingly, such computer programs represent controllers of the computing system. Thus it can be seen from the forgoing detailed description that one or more embodiments provide technical benefits and advantages.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A method, the method comprising:
   determining, by an electronic controller of a vehicle, a request for a limited-slip-differential coupling torque to be applied, wherein the request is based upon an estimation of the vehicle's mass; and
   transmitting the request to an electronic limited slip differential of the vehicle, wherein the electronic limited slip differential is configured to apply the requested limited-slip-differential coupling torque.

2. The method of claim 1, wherein the estimation of the vehicle's mass comprises an estimation of mass of a heavily-loaded or heavily-laden vehicle.

3. The method of claim 1, wherein the configured application of the requested limited-slip-differential coupling torque results in a yaw moment and a wheel rotation that causes the vehicle to move along a wider curve when the vehicle turns.

4. The method of claim 1, further comprising determining a difference between the estimated vehicle mass and a curb mass of the vehicle, wherein the determining the request for limited-slip-differential coupling torque to be applied comprises determining the coupling torque based on the determined difference.

5. The method of claim 1, wherein the determining the request for limited-slip-differential coupling torque to be applied comprises changing a default coupling torque if the estimated vehicle mass exceeds a vehicle mass threshold, wherein the default coupling torque is a configured pre-load torque that is to be applied when the estimated vehicle mass does not exceed the vehicle mass threshold.

6. The method of claim 5, wherein the changing the default coupling torque comprises changing the default coupling torque in accordance with a lookup table based on the vehicle's velocity.

7. The method of claim 5, wherein the changing the default coupling torque comprises changing the default coupling torque in accordance with a lookup table based on a braking characteristic.

8. The method of claim 1, wherein the determining the request for the limited-slip-differential coupling torque to be applied comprises determining that a hysteresis is to be applied to the limited-slip-differential coupling torque.

9. The method of claim 1, wherein the determining the request for limited-slip-differential coupling torque to be applied comprises determining a yaw error and/or a slip target based on the estimation of the vehicle mass.

10. The method of claim 1, wherein the determining the request for the limited-slip-differential coupling torque to be applied comprises determining a center of gravity based on the estimation of the vehicle mass.

11. A system within a vehicle, comprising:
an electronic controller configured to:
determine a request for a limited-slip-differential coupling torque to be applied, wherein the request is based upon an estimation of the vehicle's mass; and
transmit the request to an electronic limited slip differential of the vehicle, wherein the electronic limited slip differential is configured to apply the requested limited-slip-differential coupling torque.

12. The system of claim 11, wherein the estimation of the vehicle's mass comprises an estimation of mass of a heavily-loaded or heavily-laden vehicle.

13. The system of claim 11, wherein the configured application of the requested limited-slip-differential coupling torque results in a yaw moment and a wheel rotation that causes the vehicle to move along a wider curve when the vehicle turns.

14. The system of claim 11, wherein the electronic controller is further configured to determine a difference between the estimated vehicle mass and a curb mass of the vehicle, wherein the determining the request for limited-slip-differential coupling torque to be applied comprises determining the coupling torque based on the determined difference.

15. The system of claim 11, wherein the determining the request for limited-slip-differential coupling torque to be applied comprises changing a default coupling torque if the estimated vehicle mass exceeds a vehicle mass threshold, wherein the default coupling torque is a configured pre-load torque that is to be applied when the estimated vehicle mass does not exceed the vehicle mass threshold.

16. The system of claim 15, wherein the changing the default coupling torque comprises changing the default coupling torque in accordance with a lookup table based on the vehicle's velocity.

17. The system of claim 15, wherein the changing the default coupling torque comprises changing the default coupling torque in accordance with a lookup table based on a braking characteristic.

18. The system of claim 11, wherein the determining the request for the limited-slip-differential coupling torque to be applied comprises determining that a hysteresis is to be applied to the limited-slip-differential coupling torque.

19. The system of claim 11, wherein the determining the request for limited-slip-differential coupling torque to be applied comprises determining a yaw error and/or a slip target based on the estimation of the vehicle mass.

20. The system of claim 11, wherein the determining the request for the limited-slip-differential coupling torque to be applied comprises determining a center of gravity based on the estimation of the vehicle mass.

* * * * *